United States Patent
Huber et al.

(10) Patent No.: US 6,788,010 B2
(45) Date of Patent: Sep. 7, 2004

(54) OPERATING APPLIANCE AND AN OPERATING METHOD FOR HIGH-PRESSURE LAMPS

(75) Inventors: Andreas Huber, Maisach (DE); Bernhard Reiter, Munich (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/325,821

(22) Filed: Dec. 23, 2002

(65) Prior Publication Data

US 2003/0122505 A1 Jul. 3, 2003

(30) Foreign Application Priority Data

Jan. 2, 2002 (DE) .......................................... 102 00 046

(51) Int. Cl.[7] .................................................. G05F 1/00
(52) U.S. Cl. ........................ 315/291; 315/283; 315/307; 315/360
(58) Field of Search ................................ 315/291, 246, 315/276, 283, 287, 289, 293, 307, 308, 360, 362, DIG. 7

(56) References Cited

U.S. PATENT DOCUMENTS

| | | | | |
|---|---|---|---|---|
| 4,240,009 A | * | 12/1980 | Paul | 315/224 |
| 4,327,309 A | * | 4/1982 | Wallot | 315/170 |
| 4,914,356 A | * | 4/1990 | Cockram | 315/307 |
| 5,072,160 A | | 12/1991 | Yang | 315/287 |
| 5,103,143 A | * | 4/1992 | Daub | 315/308 |
| 5,142,203 A | * | 8/1992 | Oda et al. | 315/308 |
| 5,463,287 A | * | 10/1995 | Kurihara et al. | 315/307 |
| 2001/0030515 A1 | | 10/2001 | Huber et al. | 315/291 |
| 2003/0062849 A1 | * | 4/2003 | Prasad et al. | 315/224 |

FOREIGN PATENT DOCUMENTS

| | | |
|---|---|---|
| EP | 0241279 | 10/1987 |
| EP | 1148768 | 10/2001 |

* cited by examiner

*Primary Examiner*—James Clinger
*Assistant Examiner*—Thuy Vinh Tran

(57) ABSTRACT

A high-pressure discharge lamp (Lp) is fed with a square-wave current from an operating appliance. In order to reduce overshoots during the commutation of the lamp current, the set current value for the regulating device (5, 6) which is contained in the operating appliance is briefly reduced in the area of the commutation.

14 Claims, 4 Drawing Sheets

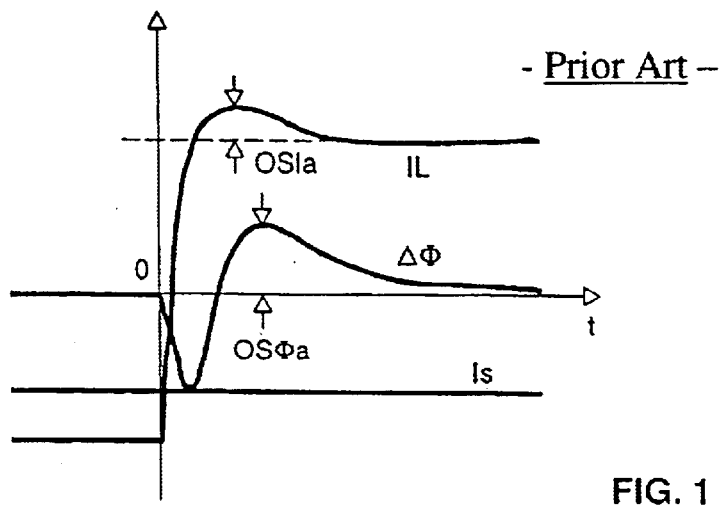
FIG. 1 - Prior Art -
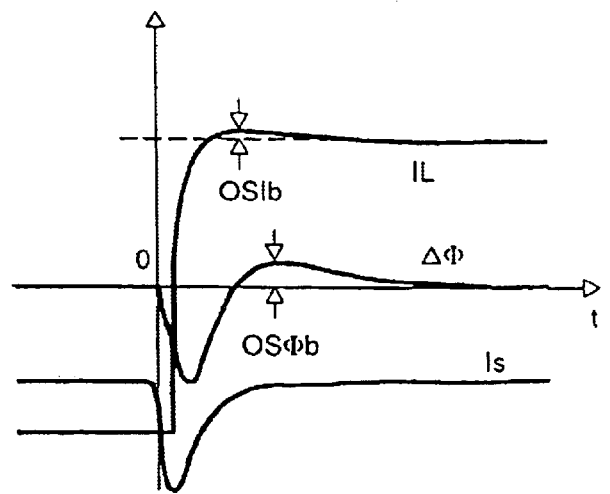
FIG. 2
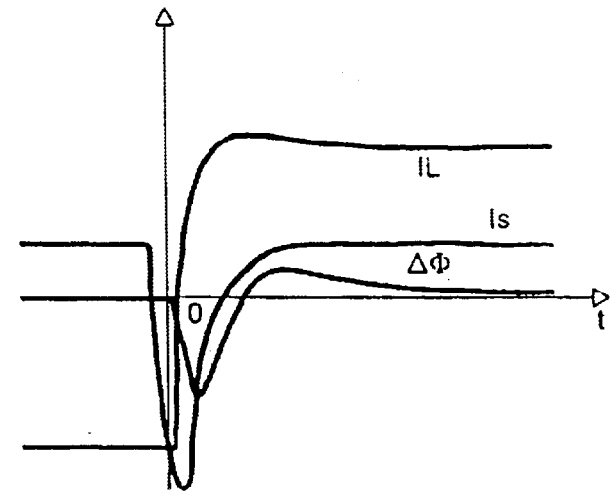
FIG. 3

OPERATING APPLIANCE AND AN OPERATING METHOD FOR HIGH-PRESSURE LAMPS

TECHNICAL FIELD

The invention is based on an operating appliance for high-pressure discharge lamps as claimed in the precharacterizing clause of claim 1. The invention in this case relates in particular to a device and to a method for controlling an operating appliance for high-pressure discharge lamps, whose polarity is reversed at regular intervals. A particular feature in this case is the magnitude of overshoots which are initiated by the polarity reversal process. Since the literature also contains the expression very-high-pressure discharge lamp, it should expressly be mentioned that the expression high-pressure discharge lamps in the following text also covers very-high-pressure discharge lamps and the like.

BACKGROUND ART

The so-called square-wave operating mode is widely used for electronic operating appliances for high-pressure discharge lamps (also referred to as a lamp in the following text). In this case, a direct current is applied to the lamp, and its polarity is reversed at regular intervals. The polarity reversal is necessary in order to avoid electrophoresis effects and to load each electrode in the lamp uniformly.

The direct current is generally provided by a pulsed power supply. These pulsed power supplies are generally based on known topologies such as step-down converters (Buck), step-up converters (Boost), inverse converters (Buck-Boost), Cúk or Sepic converters. The voltage which is supplied to the pulsed power supply is generally higher than the voltage on the lamp, so that a step-down converter is preferably used. The power which the pulsed power supply can provide for a load can generally be adjusted by the duty ratio or the switching frequency of electronic switches which are contained in the pulsed power supply. For this purpose, the pulsed power supply has a control input at which a manipulated variable is fed in. If, by way of example, the pulsed power supply is a step-down converter, then a pulse width modulator (PWM) is generally used, which converts the manipulated variable to a drive signal for the electronic switch which is contained in the step-down converter.

The document EP 1 148 768 (Huber) describes a regulation for an operating appliance of this type.

The aim of regulation is to keep the lamp power constant. This is done by forming a set variable, in the form of a current set value, as a function of the lamp voltage. This current set value is compared with a control variable in a regulating device which essentially contains a control amplifier and an adder.

The control variable is provided by a measurement device and is a measure of the current emitted by the pulsed power supply. This current can generally be equated to an inductor current of an inductor which is contained in the pulsed power supply. The measurement device is preferably in the form of a current measurement resistance through which the current which the pulsed power supply emits flows. The regulating device provides a manipulated variable, which is supplied to the control input of the pulsed power supply. This results in regulation of the high-frequency inductor current (>20 kHz) of the inductor which is contained in the pulsed power supply. Two methods for doing this are generally known: presetting the peak current through the inductor (Peak Current Mode) or presetting the mean current through the inductor (Average Current Mode). Until now, the peak current mode has been preferred since it requires less circuitry complexity and inherently limits the inductor current. In order to make it possible to supply a direct current on which as little alternating current as possible is superimposed, the pulsed power supply is followed by a filter network, which generally comprises an LC low-pass filter which contains a filter inductor and a filter capacitor.

For polarity reversal, a polarity reversal network is connected between the pulsed power supply and the lamp. This has a polarity reversal signal input at which a polarity reversal signal is fed in. This allows a control device to reverse the polarity of the lamp voltage, by means of the polarity reversal signal. The polarity reversal network is generally in the form of a full bridge, which contains four semiconductor switches with an associated drive device.

In order to start the lamp, a starting transformer is connected between the pulsed power supply and the lamp and provides a starting voltage before operation of the lamp. A resonant network, comprising an LC resonant circuit, is frequently also connected between the pulsed power supply and the starting transformer, in order to increase the achievable starting voltage.

The described configuration of an operating appliance under discussion conceals the following problem: energy storage devices (starting transformer, resonant network, filter network) are connected between the pulsed power supply and the lamp and, together, they form a reactance network. Together with the lamp, the reactance network forms a load circuit which is caused to oscillate whenever a polarity reversal process takes place. A constant light flux is required, in particular, for use in projection appliances. The polarity reversal process must therefore on the one hand be carried out as quickly as possible, while on the other hand overshoots of the lamp current, and hence of the light flux, during polarity reversal must be kept as low as possible. The control structure described in the prior art produces overshoots which have a disturbing effect in projection applications.

DISCLOSURE OF THE INVENTION

The object of the present invention is to provide an operating appliance for operation of high-pressure discharge lamps as claimed in the precharacterizing clause of claim 1, and a method for operation of high-pressure discharge lamps as claimed in the precharacterizing clause of claim 11, which reverses the polarity of the lamp current with overshoots that are less than those in the prior art.

This object is achieved by an operating appliance and an operating method for operation of high-pressure discharge lamps having the features of the precharacterizing clause of claims 1 and 11, respectively, by means of the features of the characterizing part of claims 1 and 11, respectively. Particularly advantageous refinements can be found in the dependent claims.

The set variable is normally preset by the user of a system and does not change unless the user changes his requirements for the system. Assuming a constant lamp voltage, the set variable for the lamp current is equally predetermined and is constant in the prior art. The stated precondition is generally true since the lamp voltage varies only very slowly during operation, in comparison to the time intervals between polarity reversals.

According to the invention, the set variable is reduced by a reduction value with a time profile, in synchronism with the polarity reversal and hence in synchronism with the switching signal. The intention of this reduction is to stimulate oscillation in the energy storage devices in the abovementioned reactance network, which counteracts the overshoots caused by the polarity reversal. Ideally, the overshooting is compensated for exactly according to the invention. If the manipulated variable follows the set variable only very slowly, for example by means of a control amplifier which operates essentially as an integrator, for example in a time period which lasts for longer than one microsecond, then it is advantageous to reduce the manipulated variable directly, rather than reducing the set variable. The following statements therefore also apply in the same sense to a reduction in the manipulated variable.

Since at least one microsecond passes between the start of the reduction and any reaction in the reactance network, it is advantageous for the reduction to start even before the control device emits the polarity reversal signal. Practical experiments have shown that it is advantageous to start the reduction at least one microsecond before the output of the polarity reversal signal.

The optimum duration, form and amplitude of the time profile of the reduction are dependent on the characteristics of the load circuit, in particular on its step-function response. In this context, the expression step-function response is intended to mean the reaction of a network, as is known from system theory, to a sudden change in an input variable. A step function $\sigma(t)$ is generally defined for this purpose, which assumes the value 0 before a time $t=0$ and then jumps to the value 1 at the time $t=0$ where it remains.

In the case of the operating appliances under discussion, the polarity reversal represents a step-function change in an input voltage to the load circuit, which reacts with its step-function response. The overshoots resulting from this step-function response are compensated for, according to the invention, by reducing the set variable.

Experiments have shown that the reduction must last for at least 10 microseconds after the polarity reversal in order to achieve the effect according to the invention.

It has also been shown that the reduction should start quickly and should decay slowly for the effect according to the invention. If the reduction has a pulsed time profile, this means that the fall time of the pulse must be at least three times as long as the rise time of the pulse. The following relationship is intended to verify the mathematical signs: a positive value for the reduction leads to a reduction in the set value.

It has also been shown that, with regard to the objective of the invention, it is advantageous for the reduction to remain constantly at its maximum value for a dwell time.

The amount of energy which is stored in the energy storage devices in the reactance network influences the step-function response of the load circuit. According to the invention, the amplitude of the reduction is therefore matched to the amount of energy stored in the energy storage devices in the reactance network. This is done, according to the invention, by choosing the maximum value of the reduction as a function of a lamp operating variable. For example, the current through the lamp (lamp current) is a measure of the energy stored inductively in the reactance network. The lamp voltage can also be detected instead of the lamp current, for a given lamp power.

It has been shown that the compensation according to the invention for overshoots, in particular in the lamp current, is optimum when the minimum value of the set variable which is achieved during the reduction is always the same. Since the set variable can assume different values without any reduction, the amplitude of the reduction is accordingly governed by the difference between the set value without any reduction and the constant minimum value of the set variable.

As stated above, the optimum time profile of the value of the reduction (reduction value (t)) is dependent on the step-function response of the load circuit. It has been shown that, in the simplest case, the load circuit can be modeled by a series circuit containing an equivalent inductance and an equivalent resistance. The equivalent inductance can be described approximately by the sum of the inductances contained in the reactance network. The equivalent resistance corresponds to the ratio of the lamp voltage to the lamp current at the respective lamp operating point. In the simplified model, the reduction value now ideally follows the following law:

$$\text{reduction value } (t)=\sigma(t)Ae^{-t/\tau}$$

where $\sigma(t)$ describes the unit step function, A indicates a maximum value of the reduction, and the time constant $\tau$ indicates the ratio of the equivalent load inductance to the equivalent load resistance. In practice, the reduction value cannot follow the abovementioned law exactly. At the time $t=0$, the reduction value would need to rise infinitely quickly to a start value. The reduction value would also need to act for an infinitely long time. Neither of these is feasible. It is thus sufficient for the reduction value to essentially follow the abovementioned law; that is to say to have a finite rise time and to fall to the value zero after a finite time.

As described above, a generally known step-down converter is preferably used for the pulsed power supply. It has been found that the overshoots under discussion are particularly small if the step-down converter is operated in the so-called average current mode. This is described, for example, in L. H. Dixon, "Average Current Mode Control of Switching Power Supplies", Unitrode Power Supply Seminar Manual, 1990.

The use of microcontrollers for the operating appliances according to the invention has been found to be advantageous. Both the regulating device and the control device may be formed by a microcontroller. It is particularly advantageous in this case for empirically determined values, for example the relationship between the dwell time and the time constant $\tau$ of the lamp current, to be stored in the form of tables in the microcontroller. The table values are read during operation of the lamp, so that the overshoots in the lamp current, and hence in the light flux, are thus optimized continuously.

Rather than storing the empirically obtained relationships in tables, it is also possible to carry out a mathematical approximation, for example a polynomial approximation. The microcontroller can thus, for example, calculate the dwell time and the time constant $\tau$ as a function of a measured lamp current. This makes it possible to set intermediate values, which are not recorded in a table, without any problems. Furthermore, the characteristics of the operating appliance can be set by programming a small number of parameters, which are obtained from the mathematical approximation.

A method according to the invention can also be controlled by a microcontroller. For this purpose, the microcontroller first of all reduces the given set value by a stored maximum reduction value. After a programmable time, it produces the signal for polarity reversal. After the dwell time, the microcontroller halves the reduction value a number of times using a predetermined halving clock cycle. This makes it possible to simulate the abovementioned exponential function law. The halving clock cycle in this case represents the time constant τ. At the latest when the reduction, as a result of the continuous halving process, has reached a value which is less than the resolution capability of the microcontroller, the reduction process is terminated, and is repeated during the next polarity reversal.

The reduction in overshoots according to the invention also has an advantageous effect on the generation of acoustic oscillations in the components of the operating appliance. Operating appliances according to the invention emit considerably less disturbance noise than operating appliances according to the prior art.

BRIEF DESCRIPTION OF THE DRAWINGS

The invention will be explained in more detail in the following text with reference to exemplary embodiments. In the figures:

FIG. 1 shows the time profile of a lamp current IL, of a relative light flux ΔΦ and of a set value Is according to the prior art, FIG. 2 shows the time profile according to the invention of a lamp current IL, of a relative light flux ΔΦ and of a set value Is for a low set value, which is not reduced, FIG. 3 shows the time profile according to the invention of a lamp current IL, of a relative light flux ΔΦ and of a set value Is for a high set value, which is not reduced.

Figure 4:
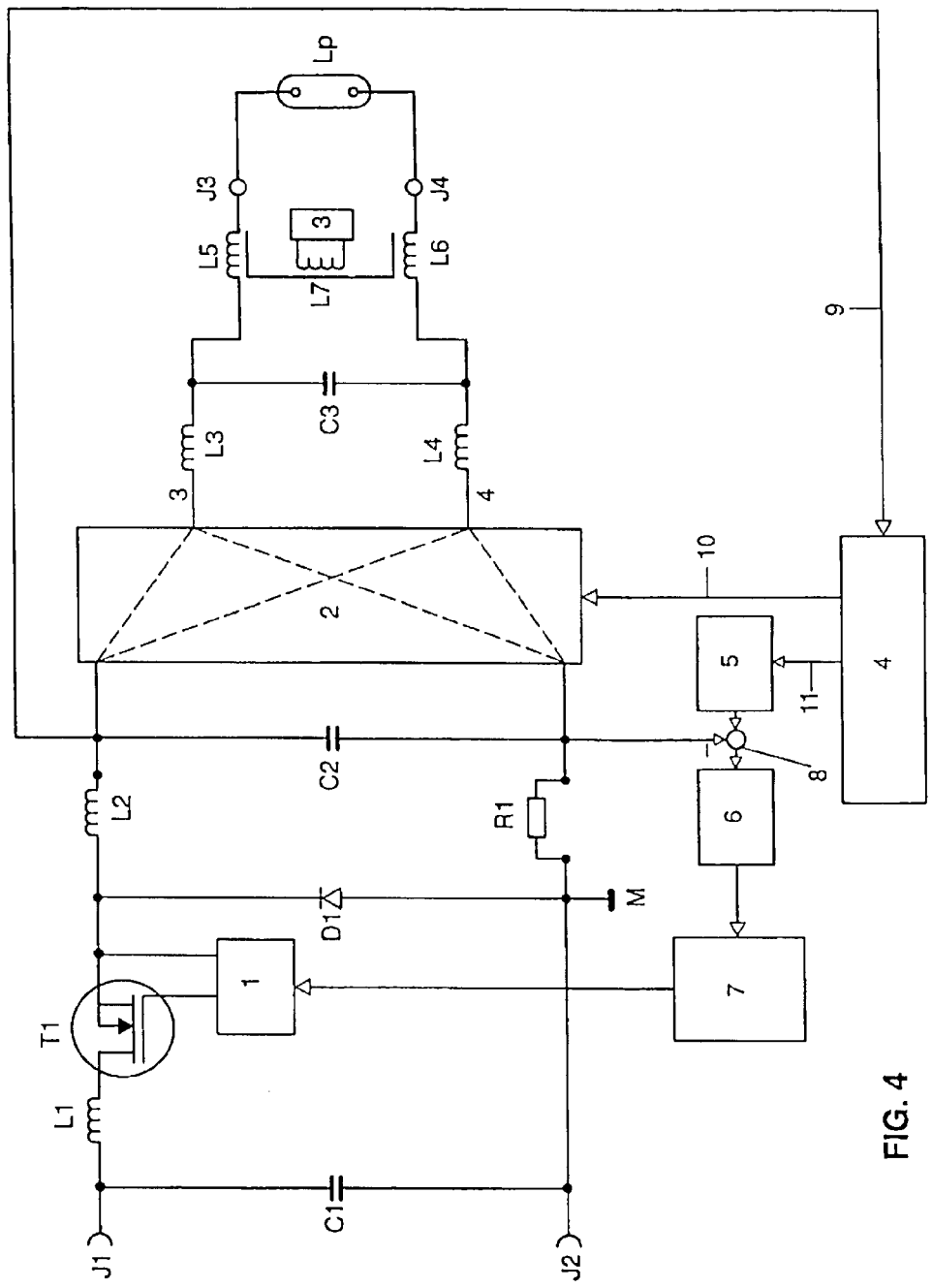
FIG. 4 shows a block diagram of an exemplary embodiment of an operating appliance according to the invention.

In the following text, resistances are denoted by the letter R, transistors by the letter T, diodes by the letter D, connecting terminals by the letter J, inductances by the letter L and capacitances by the letter C, in each case followed by a number.

BEST MODE FOR CARRYING OUT THE INVENTION

FIG. 1 shows the time profile of a lamp current IL, of a relative light flux ΔΦ and of a set value Is according to the prior art. The polarity reversal network reverses the polarity of the time t=0. Starting from a negative shoulder value, the lamp current IL rises, forming an overshoot whose magnitude is OSIa, and then tends to a positive shoulder value. The curve ΔΦ shows the profile of the light flux relating to a set light flux. At the polarity reversal time t=0, the light flux initially decreases, but then rises above the set light flux and forms the overshoot OSΦa, which has a disturbing effect, especially in projection applications. The set value Is is constant during the polarity reversal process. The reference line for Is is not the time axis t that is shown but a line which is well below the range illustrated in FIG. 1. Since the changes in Is are of major importance for the invention, a scale was chosen in which they can be seen clearly. However, the reference line in this case disappears into the range which is not illustrated. Polarity reversal in the negative direction has a profile with corresponding overshoots in the negative direction.

FIG. 2 shows the time profile for the same variables as those illustrated in FIG. 1. According to the invention, the set value Is is reduced before the polarity reversal. The maximum reduction value and hence the minimum set value are reached very quickly. After this, the reduction value falls in accordance with the abovementioned exponential law. The set value Is once again rises, after the minimum, in a corresponding way to the initial value, which it was at before the reduction. In order to achieve the desired effect according to the invention, a reduction in the set value Is at the minimum by at least 10% must be chosen. The effect of the reduction according to the invention in the lamp current IL and the relative light flux ΔΦ can clearly be seen. The overshoots OSIb and OSΦb are considerably smaller than the overshoots OSIa and OSΦa for the prior art in FIG. 1. This is achieved without any reductions in the rate at which the positive shoulder value is reached after the polarity reversal. The light flux also reaches its desired value without any delay in comparison to the prior art. Polarity reversal in the negative direction has a profile with corresponding overshoots in the negative direction. The profile of the set value Is is independent of the polarity reversal direction since, in the circuitry, the polarity reversal network follows the pulsed power supply. This means that the reduction in the set value during polarity reversal from positive lamp current values to negative lamp current values has the same profile as during polarity reversal from negative to positive values.

Like FIG. 2, FIG. 3 shows the time profile of the lamp current IL, of the relative light flux ΔΦ and of the set value Is. The curves apply to the same reactance network as in FIG. 2. Since the lamp voltage is lower, the set value Is for the lamp current is higher. It has been found that, for a given reactance network, the minimum value of the set value Is for the maximum reduction preferably remains the same, in order to achieve the same effect according to the invention. The overshoots of IL and ΔΦ in FIG. 3, according to the invention, are just as small as those in FIG. 2.

FIG. 4 shows a block diagram of one exemplary embodiment of an operating appliance according to the invention. The operating appliance is supplied via the terminals J1 and J2 with a DC voltage, with J2 being at a ground potential M. In order to avoid a high-frequency load on the DC voltage supplied, the capacitor C1 is connected between J1 and J2.

The series circuit formed by an inductance L1, a transistor T1 and a diode D1 is connected between J1 and J2. L1 is a suppression inductor with a comparatively small inductance. A filter network comprising the series circuits formed by a filter inductor L2 and a filter capacitor C2 is connected in parallel with D1, whose anode is connected to the ground potential M. L2, T1 and D1 together with a driver circuit 1 for driving T1 form a generally known step-down converter. The output voltage from the step-down converter is applied to C2. C2 is connected to the ground potential M via a measurement resistor R1.

The current supplied by the pulsed power supply flows via R1. The voltage drop across R1 is thus a measure of the current supplied by the pulsed power supply, and is thus indirectly a measure of the lamp current, and forms the control variable.

The output voltage from the step-down converter is fed into the polarity reversal network 2. The possible connections which, for example, may be switched by means of semiconductor switches, are shown by dashed lines in this figure. The points 3 and 4 form the output of the polarity reversal network 2 and are connected via a respective inductance L3, L4 and a secondary winding of a respective starting transformer L5, L6 to the lamp connecting terminals J3, J4 to which a lamp Lp can be connected. The sides of L3 and L4 which face away from the switching network are connected via a capacitor C3. L3, L4 and C3 form a resonant network which assists the starting of the lamp by producing an increase in voltage, with respect to the voltage at the output of the polarity reversal network, at C3. L3 and L4 may also be coupled to one another.

In addition to the secondary windings L5 and L6, the starting transformer has a primary winding L7 to which a starting controller 3 is connected. Via the starting transformer, this produces a voltage on the lamp Lp before operation of the lamp, which is suitable for starting the lamp. The inductances L3, L4, L5 and L6 are not required for operation of the lamp after starting but, together with L2, C2 and C3, they form a reactance network which has a significant influence on overshooting during polarity reversal.

The operating appliance has a device 5, referred to as a set value transmitter in the following text, which emits a set variable in the form of a current set value. The current set value is fed to an adder 8. The voltage drop across R1, which represents the control variable, is supplied in inverted form to the adder 8. The addition result from the adder 8 is supplied to a control amplifier 6. In general, the control amplifier 6 has a PI characteristic, as is stated in the abovementioned literature reference (Dixon). The output from the control amplifier represents a manipulated variable, which is supplied via a pulse width modulator 7 to a control input of the pulsed power supply. The control input is the input of the driver circuit 1, which drives the transistor T1.

Together with the adder, the control amplifier 6 forms a regulating device.

According to the invention, the operating appliance contains a control device 4, which generates a reduction value and feeds this via a connection 11 into the set value transmitter 5. Since the control device 4 controls the polarity reversal process via a connection 10, the set value can be reduced in synchronism with the polarity reversal via the connection 11 in the set value transmitter 5. The reduction in the set value in the set value transmitter 5 can be produced, for example, by a subtraction circuit, which subtracts the reduction value from a fixed predetermined preset set value.

The reduction value can also be supplied with the same effect, in inverted form, from the control device 4 to the adder 8.

Via the connection 9, the control device 4 receives information about the burning voltage of the lamp. Depending on the burning voltage, the control device 4 according to the invention chooses the amplitude of the reduction with the aid of a characteristic which is stored in the control device 4, and which may be stored in the form of a table. As is already known from the prior art, information about the lamp voltage is also used via the connection 11 to modify the constant value of the set variable between the polarity reversal processes. However, in this case, there is no reduction according to the invention in the set value during the polarity reversal process.

The device 5 for providing a set variable, the control amplifier 6, the adder 8, the pulse width modulator 7 and the control device 4 may be formed by a microcontroller.

Figure 5:
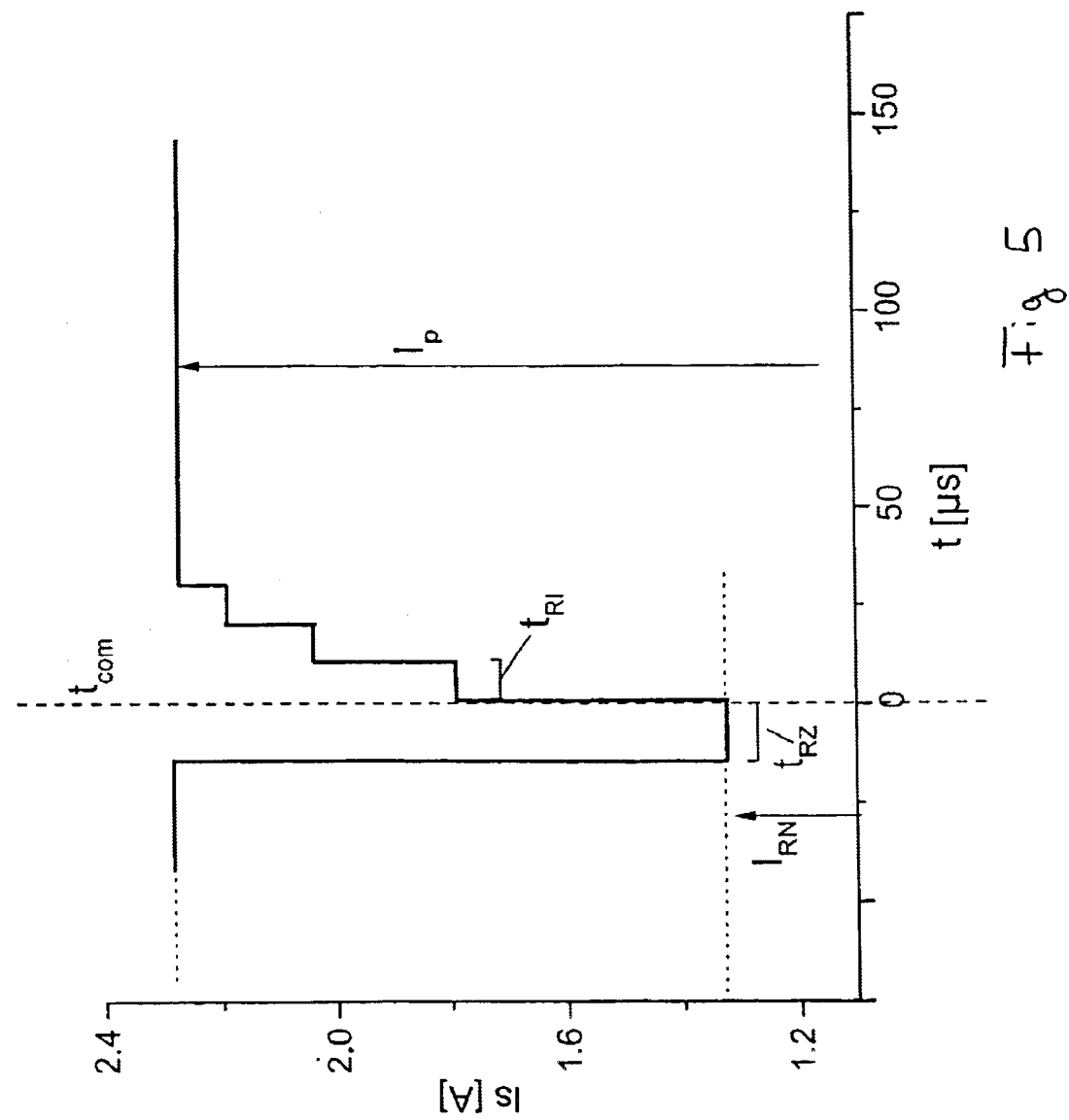
FIG. 5 shows the time profile according to the invention of the set value Is, as is produced by a microcontroller.

By way of example, FIG. 5 shows the time profile according to the invention of the set value Is, as is produced by a microcontroller. Before the polarity reversal process, the microcontroller reduces the set value Is in one step from a nominal set value Ip, which is approximately 2.3 A, by a maximum reduction value to a minimum set value IRN of approximately 1.3 A. The maximum reduction value is maintained for a dwell time tRZ of approximately 25 µs. After the dwell time tRZ, the polarity reversal time tcom is reached, at which the microcontroller initiates the reversal in the polarity of the lamp voltage. The microcontroller then halves the reduction value. The microcontroller halves the reduction value a number of times at time intervals which are predetermined by a halving clock cycle tRI. After the third halving clock cycle tRI, the microcontroller once again assumes the nominal set value Ip. The process starts once again at a time advanced by the dwell time tRZ before the next polarity reversal.

Figure 6:
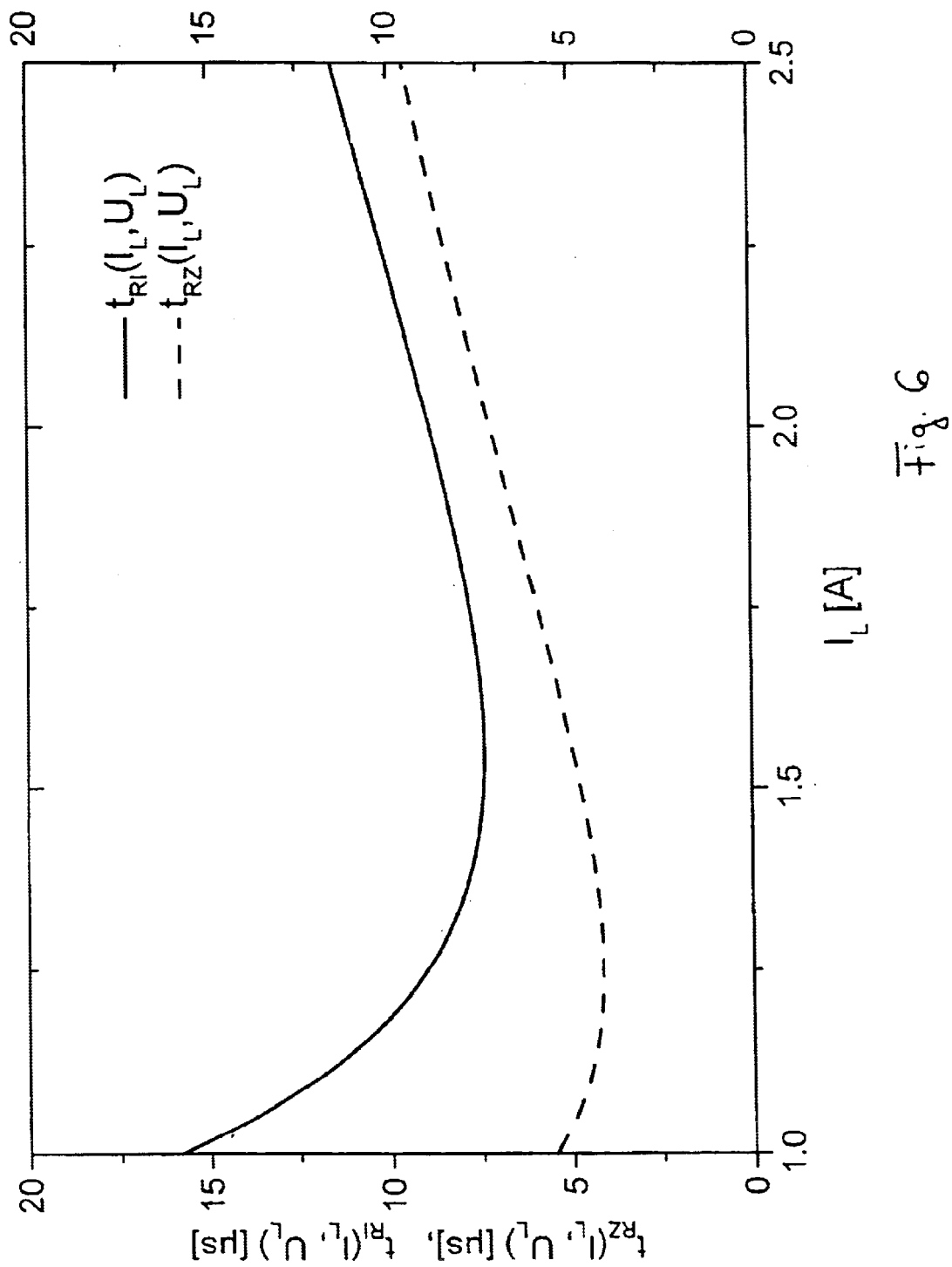
FIG. 6 shows an example of an illustration in the form of a graph of an empirically determined relationship between an optimum dwell time and an optimum halving clock cycle for the lamp current.

FIG. 6 shows an illustration in the form of a graph for an empirically determined relationship between an optimum dwell time tRZ and an optimum halving clock cycle tRI for a lamp current IL. The relationship between the dwell time tRZ and the lamp current IL is shown by dashed lines. The relationship between the halving clock cycle tRZ and the lamp current IL is shown by solid lines. Changes in the reactance network of the operating appliance lead to different relationships. FIG. 6 in each case shows the dwell time tRZ and the halving clock cycle tRI as a function of the lamp current IL and of the lamp voltage UL. In consequence, the relationship takes account of the fact that it is primarily the power of the lamp which is regulated. The lamp current IL can thus be converted to the lamp voltage UL via the lamp power. The relationships illustrated in FIG. 6 may be stored in the microcontroller in the form of tables, or in the form of a mathematical approximation. The operating appliance thus automatically optimizes itself with respect to operating variables such as the lamp current IL or the lamp voltage UL.

What is claimed is:

1. An operating appliance for operation of high-pressure discharge lamps comprising:
    a pulsed power supply (L2, C2, T1, D1, 1), which supplies a power and provides an operating current for a high-pressure discharge lamp (Lp),
    a polarity reversal network (2) via which the high-pressure discharge lamp (Lp) is coupled to the pulsed power supply, having a polarity reversal signal input at which a polarity reversal signal is fed in (10), which controls polarity reversal of an operating voltage for the high-pressure discharge lamp (Lp),
    a control device (4) which provides a switching signal,
    a control input for the pulsed power supply (L2, C2, T1, D1, 1), at which a manipulated variable is fed in, with aid of which the power which is provided by the pulsed power supply (L2, C2, T1, D1, 1) is varied,
    a measurement device (R1) for providing a control variable, which is a measure of the operating current which the pulsed power supply (L2, C2, T1, D1, 1) emits,
    a device (5) for providing a set variable which is a measure of a current set value,
    a regulating device (6, 8) into which the set variable and the control variable are fed and which emits a manipulated variable as a function of the difference between the set variable and the control variable,
    characterized in that the control device (4) contains means which provide a reduction value by which the set variable or the manipulated variable is reduced in synchronism with the switching signal during a reduction.

2. The operating appliance as claimed in claim 1, characterized in that the reduction starts at least 1 microsecond before the polarity reversal.

3. The operating appliance as claimed in claim 1, characterized in that the reduction lasts for at least 10 microseconds after the polarity reversal.

4. The operating appliance as claimed in claim 1, characterized in that a time profile of the reduction value is pulsed, with a fall time of the pulse lusting for at least three times as long as a rise time of the pulse.

5. The operating appliance as claimed in claim 1, characterized in that the reduction value has a maximum value which is chosen as a function of a lamp operating variable.

6. The operating appliance as claimed in claim 1, characterized in that the reduction keeps its maximum value constant for a dwell time (tRZ).

7. The operating appliance as claimed in claim 1, characterized in that a minimum value to which the set variable or the manipulated variable is reduced during a reduction is the same for each reduction.

8. The operating appliance as claimed in claim 1, characterized in that a time profile of the reduction value essentially follows an equation:

$$\text{reduction value } (t) = \sigma(t) A e^{-t/\tau}$$

where $\sigma(t)$ describes a unit step function, A indicates a maximum value of the reduction, and $\tau$ indicates a ratio of an equivalent load inductance to an equivalent load resistance.

9. The operating appliance as claimed in claim 1, characterized in that the pulsed power supply (L2, C2, T1, D1, 1) is a step-down converter.

10. The operating appliance as claimed in claim 1, characterized in that the pulsed power supply (L2, C2, T1, D1, 1) is a step-down converter with average current mode control.

11. The operating appliance as claimed in claim 1, characterized in that the regulating device (6, 8) and the control device (4) are included in a microcontroller.

12. The operating appliance as claimed in claim 1, characterized in that the control device (4) sets the reduction to a maximum value in one step and halves it in at least three steps using a uniform halving clock cycle (tRI).

13. A method for controlling a high-pressure discharge lamp (Lp), whose polarity is reversed at regular intervals and is regulated by presetting a set value for one operating parameter by means of a manipulated variable value, characterized by the following method steps:

before reversing polarity of the high-pressure discharge lamp (Lp), reducing the set value or the manipulated variable value by a reduction value, waiting for a dwell time (tRZ), reversing polarity of the high-pressure discharge lamp (Lp), halving the reduction value at least three times in regular (tRI) successive time steps, setting the originally predetermined set value.

14. The method as claimed in claim 13, characterized in that the polarity reversal process is carried out during the dwell time (tRZ).

* * * * *